(No Model.)　　　　　　　R. A. HORNING.　　　2 Sheets—Sheet 1.
HOBBY HORSE.
No. 517,142.　　　　　　　　　Patented Mar. 27, 1894.
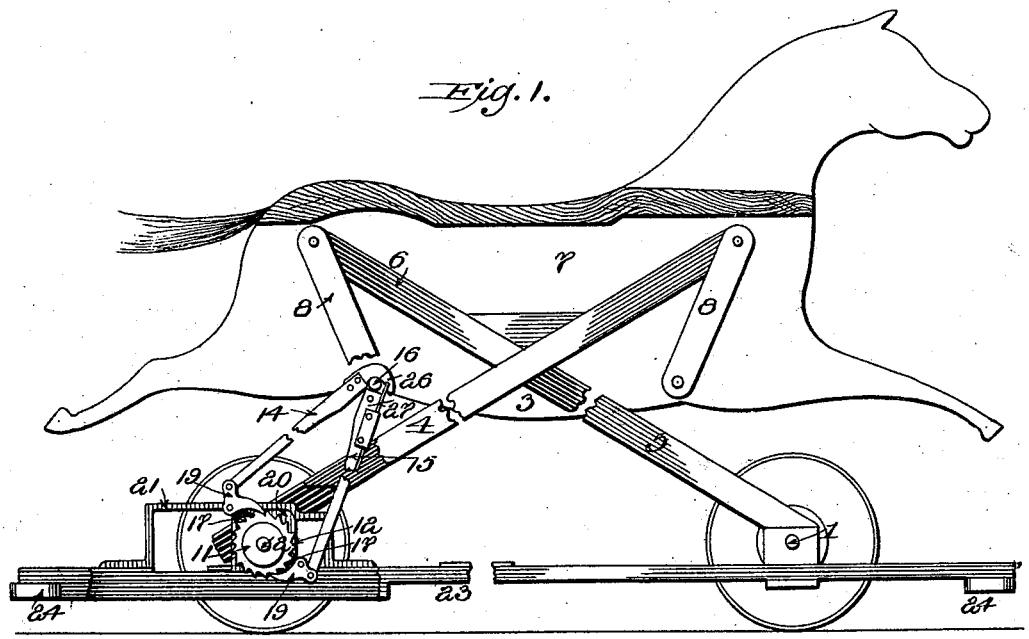
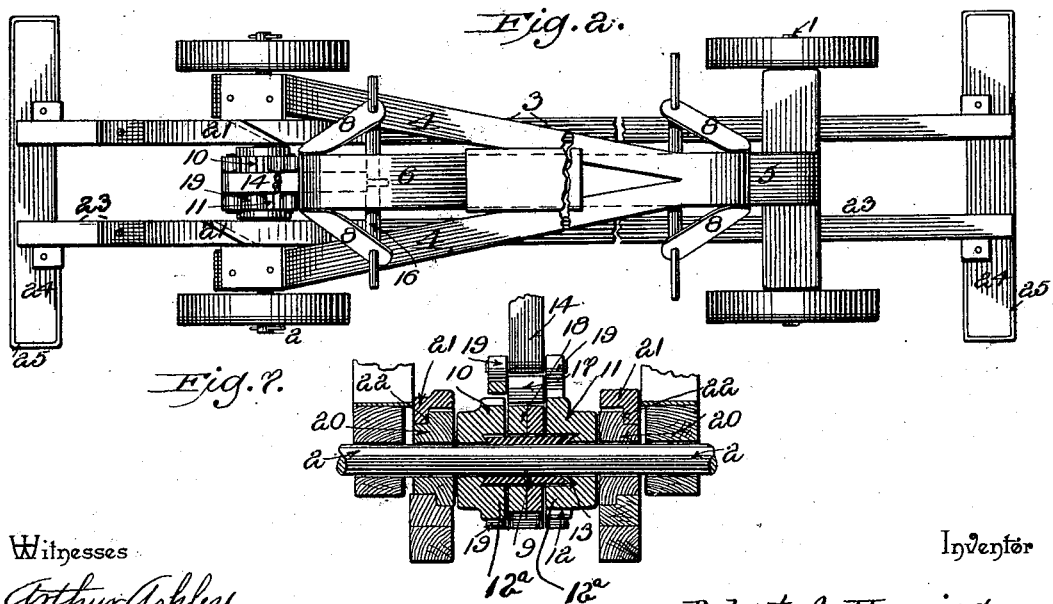
Witnesses　　　　　　　　　　　　　　　　Inventor
Arthur Ashley　　　　　　　　　　　　　Robert A. Horning.
By his Attorneys
C. A. Snow & Co.

(No Model.) 2 Sheets—Sheet 2.
R. A. HORNING.
HOBBY HORSE.
No. 517,142. Patented Mar. 27, 1894.
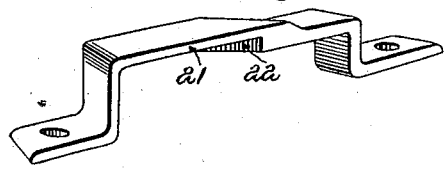
Fig. 3.
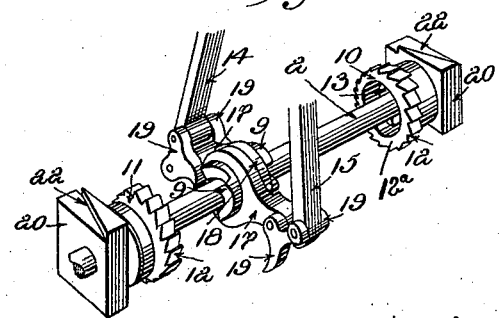
Fig. 4.
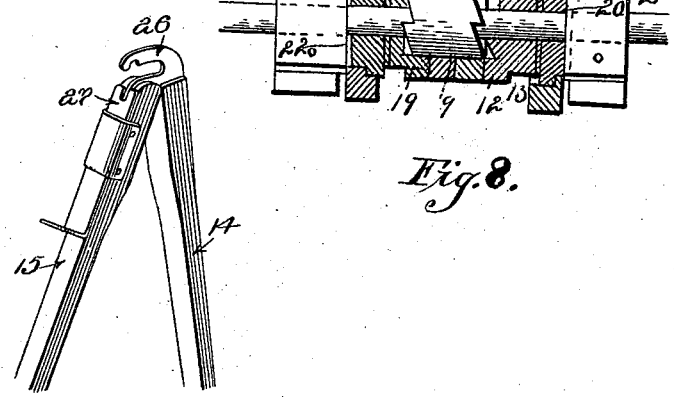
Fig. 5.
Fig. 8.
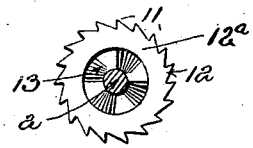
Fig. 6.
Witnesses
Arthur Ashley
Inventor
Robert A. Horning.
By his Attorneys,
C. A. Snow & Co.

UNITED STATES PATENT OFFICE.

ROBERT ALLEN HORNING, OF LANARK, ILLINOIS, ASSIGNOR OF ONE-HALF TO HARRY HEPFER, OF SAME PLACE.

HOBBY-HORSE.

SPECIFICATION forming part of Letters Patent No. 517,142, dated March 27, 1894.

Application filed May 26, 1893. Serial No. 475,633. (No model.)

*To all whom it may concern:*

Be it known that I, ROBERT ALLEN HORNING, a citizen of the United States, residing at Lanark, in the county of Carroll and State of Illinois, have invented a new and useful Hobby-Horse, of which the following is a specification.

My invention relates to vehicles which are propelled by the rider or occupant and which are capable of being propelled either forwardly or backwardly, the objects in view being to provide means for automatically reversing the propelling devices or the operating connections between the lever or source of power and the carrying wheels when the vehicle encounters an obstacle, whereby the vehicle progresses steadily in one direction until it meets an obstacle and then returns upon its tracks until again checked.

My invention is designed especially for use in connection with hobby-horses, velocipedes, and similar wheeled vehicles, boats, invalid chairs, &c., in order to enable the rider or occupant while operating the driving mechanism to progress continuously in one direction or the other, irrespective of the limited amount of space allowed for movement, and without the special manipulation or reversing of the clutches, and without changing the method or means of propulsion.

I have illustrated my invention applied to a hobby-horse and provided with a shifting-bar or frame which projects in front and in rear of the device in position to come in contact with a chair or the wall or any similar obstacle, such shifting-bar being capable of longitudinal movement, in the direction of progress, whereby it is repressed upon contacting with an obstacle, thereby reversing a clutch which is employed as a means of communicating motion to the driving-wheels.

Further objects and advantages of my invention will appear in the following description and the novel features thereof will be particularly pointed out in the claims.

In the drawings—Figure 1 is a side view, partly broken away, of mechanism embodying my invention applied to a hobby-horse. Fig. 2 is a plan view of the mechanism. Fig. 3 is a detail view of one of the guides. Fig. 4 is a similar view of the ratchet gearing with the parts dis-assembled. Fig. 5 is a similar view of the upper portion of the pawl bearing arms. Fig. 6 is a detail view of one of the side ratchets, showing the inner side thereof. Fig. 7 is a transverse sectional view of the clutch and shifting mechanisms taken parallel with the driving shaft. Fig. 8 is a rear view partly broken away of the driving and clutch mechanisms.

Similar numerals of reference indicate corresponding parts in all the figures of the drawings.

1 and 2 represent, respectively, the front and rear axles of which the latter is the driving-shaft of the mechanism, and 3 represents the supporting frame which connects said axles and comprises the rearwardly divergent bars 4 and the forwardly-extending bar 5 which intersect at intermediate points and extend beyond such intersection to form the supporting arms 6. The rocking or oscillating part or lever, which in this case is represented as a horse 7, is suspended from the extremities of these supporting arms by means of suitable links 8, whereby said part or lever 7 is capable of a forward backward and rocking motion which is in imitation of the movement of a horse in running.

The driving-axle 2 carries a fixed double ratchet 9, keyed to the shaft and 10 and 11 represent, respectively, right and left ratchets which are rotatably mounted upon the driving-axle and are provided with exterior peripheral teeth 12, which are inclined, respectively, in opposite directions, and interior clutch-teeth 13 which are arranged to engage the fixed ratchet upon the axle. While capable of rotation independently of each other and of the shaft, these rotary ratchets are held at such an interval that only one can engage the fixed ratchet at a time, and hence to engage the other ratchet therewith they must be moved laterally, or shifted.

14 and 15 represent pawl-bearing arms which are pivotally connected at their upper ends to a cross-bar 16 upon the oscillating part or lever and are provided at their lower ends with oscillating extensions or links 17, having rings 18 rotatably and slidably mounted upon the driving-axle between the rotary ratchets, the combined widths of said rings, which are interposed between the inwardly extending flanges 12ᵃ of the side ratchets, being such as to prevent both of the ratchets 13 from coming in contact with the fixed ratchet, simultaneously. Said rings 18 being slidable, adjust themselves to the position of the side ratchets and hence enable either side ratchet to engage with the juxtaposed end of the fixed ratchet, said rings performing the additional function of interposed washers to communicate the slidable motion of one side ratchet to the other, when the first named ratchet is pushed laterally by the shifting mechanism. Each pawl-bearing arm carries two oppositely-disposed pawls 19 arranged respectively in operative relation to the rotary ratchets and pivoted to the extensions or links 17.

The motion of the pawl-bearing arms during operation is essentially reciprocatory, and as the free ends thereof are arranged, respectively, upon opposite sides of the driving-axle and pawls carried by each arm are oppositely-disposed and connect respectively to the right and left ratchets, both of the latter will receive a rotary impulse at each vibration of the pawl-bearing arms, and hence at each vibration of the oscillating part or lever.

Inasmuch as only one of the rotary ratchets is in operative relation to the fixed ratchet at a time, it will be understood that during operation one of said rotary ratchets turns idly while the other operates the driving-axle, and hence in order to provide for movement of the device in opposite directions it is necessary to employ a shifting device whereby either rotary ratchet may be thrown into engagement with the fixed ratchet. The means which I prefer to employ for this purpose consist of shifting-blocks 20 which are arranged respectively in contact with the outer sides or hubs of the rotary ratchets and fit slidably in guides 21; said blocks and guides being provided with correspondingly disposed beveled shoulders 22, whereby, as the guides are moved simultaneously in a direction parallel with the direction of movement of the vehicle, the shifting-blocks will be moved transversely or in a direction perpendicular to the direction of movement of the vehicle, thereby causing a corresponding lateral movement of the rotary ratchets and causing the latter to engage the fixed ratchet alternately.

In order to enable the shifting mechanism to be automatically operated I provide a reversing bar or frame 23 which is slidably mounted upon the vehicle, carries the guides 21 and projects at its extremities in front and in rear of the vehicle in order to be the part which first encounters an obstacle. This reversing bar is preferably carried by the front and rear axles of the vehicle, the guide 21 forming the means of connecting the bar to the rear axle, and it is provided at its extremities with cross-heads 24 which are provided with suitable padding 25 to avoid injuring articles with which they come in contact.

The operation of the device when used in connection with a hobby-horse will be readily understood from the foregoing description. The oscillation of the lever or body of the device causes a reciprocation of the pawl-bearing arms which is communicated by means of the rotary and fixed ratchets to the driving axle, hence causing the vehicle to advance in one direction or the other according to whether the right or left hand rotary ratchet is in operative relation to the fixed ratchet. Progression in this direction continues until the forward end of the reversing bar encounters an obstacle and is repressed, when the longitudinal movement of such reversing bar is converted by means of the shouldered guides and shifting-blocks into a transverse movement of the rotary ratchets, thereby bringing the previously idle ratchet into operative position and causing the operation of the oscillating part or lever to produce a rectilinear movement of the vehicle in the opposite direction to that which was produced previous to contact with the obstacle.

In order to enable the propelling mechanism to be detached when the device, as illustrated, is to be used as an ordinary rocking-horse, I provide a catch for connecting the upper ends of the pawl-bearing arms to the cross-bar which is carried by the oscillating part or lever, such catch consisting of a hook 26 and a slide 27 to close the mouth of said hook.

From the above description it will be understood that the form of the oscillating part or lever constitutes no part of my invention and may be varied at will. When the mechanism, as described, is used in connection with velocipedes and other similar vehicles the power may be derived from hand or foot levers in the ordinary or any approved manner without departing from the spirit or intent of my invention. Furthermore, various changes in the form, proportion and minor details of construction can be resorted to in adapting the mechanism to various styles of vehicles without departing from my invention or sacrificing any of the advantages thereof.

Having described my invention, what I claim is—

1. In a vehicle, the combination with the driving axle, of a ratchet fixed to and carried thereby, reverse driving ratchets rotatably mounted upon the axle and adapted to alternately engage the fixed ratchet, shifting mechanism connected to the said driving ratchets, an operating part or lever, connections between said part or lever and the driving ratchets, and a reversing bar connected to the shifting mechanism, substantially as specified.

2. The combination with the driving axle, of oppositely rotatable driving ratchets mounted upon the axle and adapted to be alternately connected thereto, an operating part or lever, connections between said part or lever and the driving ratchets, a shifting mechanism connected to the driving ratchets, and a reversing bar connected to the shifting mechanism, substantially as specified.

3. The combination with the driving axle, of oppositely rotatable driving ratchets, clutch mechanisms for connecting either of said ratchets with the axle, an operating part or lever, connections between said part or lever and the driving ratchets, and a reversing bar provided with shifting devices to operate said clutch mechanisms, substantially as specified.

4. The combination with the driving axle, of rotatable driving ratchets, clutch mechanisms for connecting either of said ratchets to the driving axle, an oscillating part or lever operatively connected to the said ratchets, a reversing bar, shifting blocks connected to said clutch mechanisms, and a shifting guide carried by the reversing bar and operatively connected to the shifting blocks, substantially as specified.

5. The combination with the driving axle, of rotatable driving ratchets, a clutch mechanism for connecting either of said ratchets with the axle, an operating part or lever operatively connected to said ratchets whereby they are rotated continuously in opposite directions, a slidable reversing bar provided with shifting guides, and slidable shifting blocks operated by said guides and connected to the clutch mechanism, substantially as specified.

6. The combination with the driving axle, of oppositely rotatable driving ratchets, a clutch mechanism to connect either of said ratchets to the axle, an operating part or lever connected to said ratchets to impart continuous rotary motion in opposite directions thereto, a slidable reversing bar capable of movement in a direction perpendicular to the axis of the driving axle, guides carried by said bar and provided with beveled shoulders, and shifting blocks slidably mounted upon the axle in operative relation to the clutch mechanism and provided with shoulders engaging the shoulders of the guides, substantially as specified.

7. The combination with the supporting framework, a driving axle, and an oscillating part or lever mounted upon the supporting framework, of a reversible driving mechanism operatively connected to the axle and having oppositely rotatable driving ratchets, a clutch mechanism for connecting either of said ratchets to the axle, means for operating said clutch mechanism, and pawl-bearing arms connected to the oscillating part or lever and carrying oppositely disposed actuating pawls engaging the driving ratchets, respectively, to impart rotary movement in opposite directions thereto, substantially as specified.

8. The combination with the supporting framework, a driving axle, and an oscillating part or lever mounted upon the supporting framework, of a reversible driving mechanism operatively connected to the axle and having oppositely rotatable driving ratchets, a clutch mechanism for connecting either of said ratchets to the axle, means for operating said clutch mechanism, pawl-bearing arms operatively connected to said driving ratchets to impart rotary movement in opposite directions thereto, and a detachable connection between said arms and the oscillating part or lever, substantially as specified.

9. The combination with the supporting framework, a driving axle, and an oscillating part or lever mounted upon the supporting framework, of a reversible driving mechanism operatively connected to the axle and having oppositely rotatable driving ratchets, a clutch mechanism for connecting either of said ratchets to the axle, means for operating said clutch mechanism, pawl-bearing arms operatively connected to said driving ratchets to impart rotary movement in opposite directions thereto, and a catch for connecting said arms to the oscillating part or lever, the same comprising a hook to engage a cross-bar carried by the said part or lever, and a slide to close the mouth of said hook, substantially as specified.

10. In a vehicle, the combination of a supporting framework provided with upwardly divergent supporting arms, carrying wheels, a driving axle, a reversible operating mechanism connected to said axle and having oppositely rotatable driving ratchets, a reversing bar, connections between said reversing bar and the driving mechanism, an oscillating part or lever connected by links to said supporting arms, and pawl-bearing arms pivotally connected to said part or lever and having their pawls arranged in operative relation to the driving ratchets, substantially as specified.

In testimony that I claim the foregoing as my own I have hereto affixed my signature in the presence of two witnesses.

ROBERT ALLEN HORNING.

Witnesses:
H. M. BEANS,
J. W. CLAY GLOTFELTY.